United States Patent [19]

Takahashi et al.

[11] Patent Number: 5,901,051
[45] Date of Patent: May 4, 1999

[54] SWITCHING POWER SUPPLY HAVING CURRENT AND VOLTAGE SUPERIMPOSITION CIRCUITRY

[75] Inventors: Seiichi Takahashi, Sagamihara; Koji Nishi, Yokohama; Yasuo Ohashi, Tokyo-to, all of Japan

[73] Assignee: Murata Manufacturing Co., Ltd., Japan

[21] Appl. No.: 08/746,664

[22] Filed: Nov. 14, 1996

[30] Foreign Application Priority Data

Nov. 17, 1995 [JP] Japan ................................. 7-323655
Sep. 6, 1996 [JP] Japan ................................. 8-257474

[51] Int. Cl.⁶ ............................................. H02M 3/335
[52] U.S. Cl. ............................................. 363/21; 363/41
[58] Field of Search ............................. 363/20, 21, 41, 363/95

[56] References Cited

U.S. PATENT DOCUMENTS 3,916,281 10/1975 Owen ................................. 323/DIG. 1
5,068,575 11/1991 Dunsmore et al. .................. 363/21
5,406,469 4/1995 Schwarz ............................. 363/21

*Primary Examiner*—Robert E. Nappi
*Assistant Examiner*—Derek J. Jardieu
*Attorney, Agent, or Firm*—Ostrolenk, Faber, Gerb & Soffen, LLP

[57] ABSTRACT

According to one embodiment of a switching power supply, a superimposition circuit including a resistor is connected in parallel to the primary coil of a transformer. A superimposition current is supplied to a current sensing circuit during a switching-on period of a switching element. The current sensing circuit detects the current flowing through the primary coil during the switch-on period. According to the detected current, a switch control circuit controls switching on and off of the switching element so as to stabilize the output voltage. When the current becomes low in a case in which the circuit has a light load or receives a high input voltage, noise generally causes substantial adverse effects. However, since the detected current in the current sensing circuit is biased to become larger by superimposing the superimposition current of the superimposition circuit on the current flowing through the primary coil, the output voltage is stabilized without receiving adverse effects of noise even if the current passing through the primary coil becomes low.

8 Claims, 15 Drawing Sheets

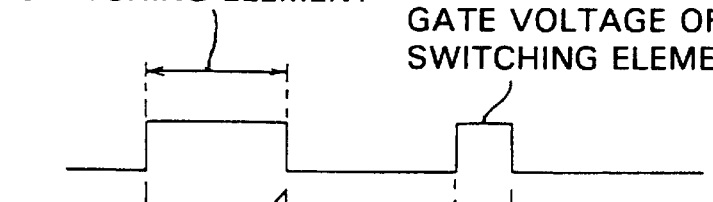
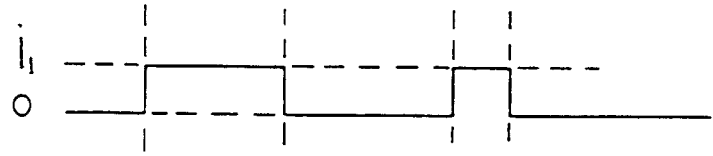
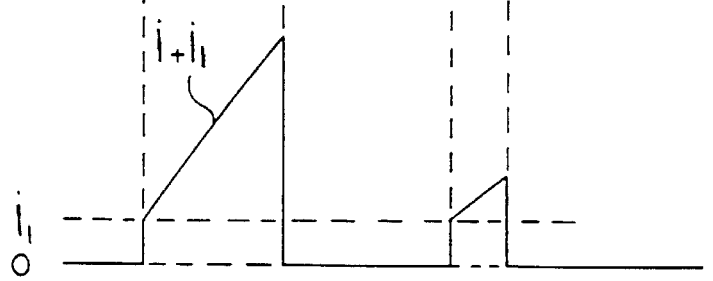
FIG. 2(a)
FIG. 2(b)
FIG. 2(c)
FIG. 2(d)

FIG. 5
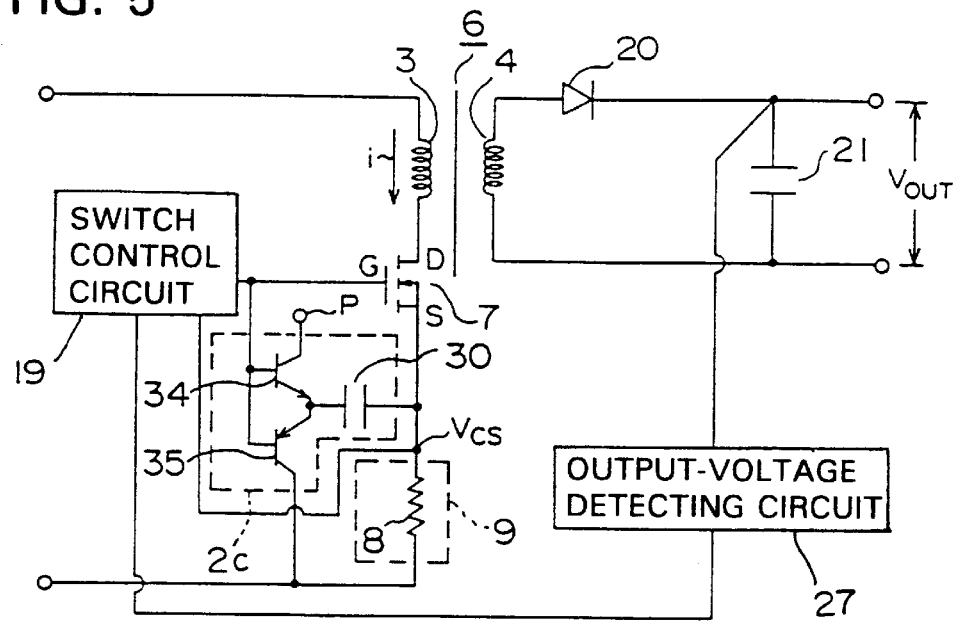
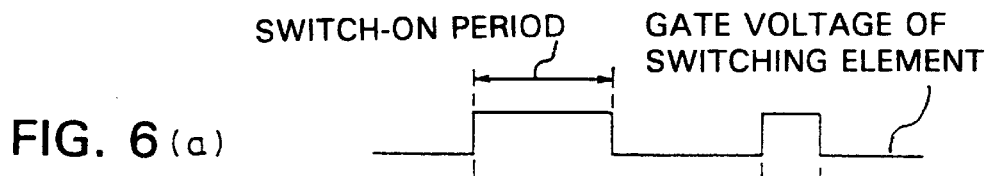
FIG. 6(a)
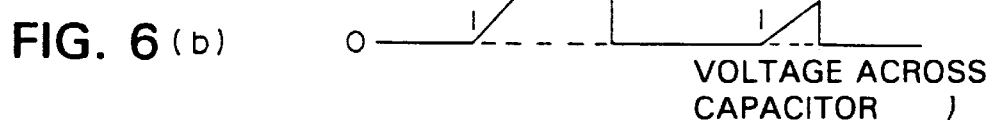
FIG. 6(b)
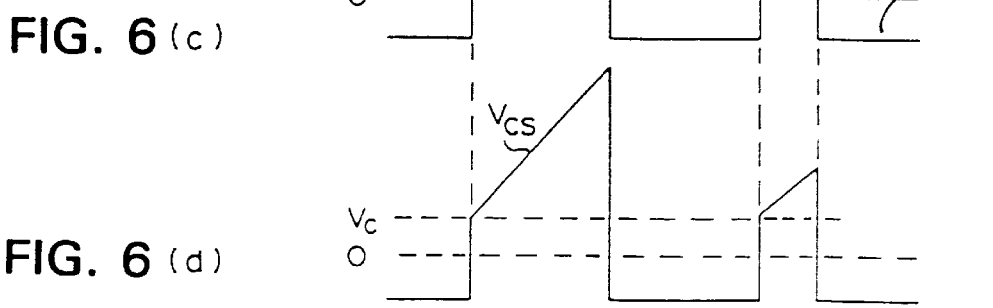
FIG. 6(c)
FIG. 6(d)

SWITCHING POWER SUPPLY HAVING CURRENT AND VOLTAGE SUPERIMPOSITION CIRCUITRY

BACKGROUND OF THE INVENTION

1. Field of the Invention

The present invention relates to a switching power supply, particularly for use as a DC—DC converter.

2. Description of the Related Art

FIG. 20 shows a main circuit of a switching power supply of flyback converter type. The circuit includes a transformer 6 having a primary coil 3, a secondary coil 4, and a third coil 5, a switching element 7 made up of a field effect transistor (FET), a current sensing circuit 9 made up of a resistor 8, an AC input power supply 10, a diode bridge circuit 11, a smoothing capacitor 12, a starting resistor 13, an IC-input capacitor 14, a diode 15, a switch control circuit 19 having an oscillator (OSC) 16, an RS flip-flop circuit 17, and a comparator 18 and integrated into a chip, a diode 20, a capacitor 21, and an output-voltage detecting circuit 27 having voltage-dividing resistors 22 and 23, an error amplifier 24, a photo-coupled isolator 25, and a reference power supply 26.

The operation of the circuit shown in FIG. 20 will be briefly described below by referring to a timing chart shown in FIGS. 21(a)–21(f). The OSC 16 in the switch control circuit 19 applies a constant-period pulse signal shown in FIG. 21 (d) to the set input terminal (S) of the RS flip-flop circuit 17. When the RS flip-flop circuit 17 receives the on-level output (set pulse) of the pulse signal from the OSC 16 at the set input terminal (S), it immediately outputs the on-level output of the pulse signal (gate-pulse signal) shown in FIG. 21 (f), from the output terminal (Q) to the gate G of the switching element 7. Then, the switching element 7 goes on due to the on-level output of the gate-pulse signal. When the switching element 7 is turned on, a current "i" based on the input power supply 10 and the charged voltage of the smoothing capacitor 12 flows through a path passing through the primary coil 3 of the transformer 6 and the current sensing circuit 9 (resistor 8). Electromagnetic energy is accumulated at the primary coil 3 due to the flow of the current "i." The current sensing circuit 9 converts the current "i" to a voltage, and outputs the voltage to the non-inverting input terminal of the comparator 18 as a detected voltage $V_{CS}$ shown in FIG. 21 (c).

During the switch-on period, the voltage across the capacitor 21 at the output side of the transformer 6 is output as the output voltage $V_{out}$ shown in FIG. 21 (a), and the output voltage $V_{out}$ is divided by the voltage-dividing resistors 22 and 23 in the output-voltage detecting circuit 27 and is input to the inverting input terminal of the error amplifier 24. A reference voltage output from the reference power supply 26 is applied to the non-inverting input terminal of the error amplifier 24. According to the difference between the divided voltage of the output voltage $V_{out}$ and the reference voltage of the reference power supply 26, the error amplifier 24 outputs the voltage $V_e$ shown in FIG. 21 (b) to the inverting input terminal of the comparator 18 through the photo-coupled isolator 25 in the output-voltage detecting circuit 27, as the detected voltage $V_f$ shown in FIG. 21 (c).

When the detected voltage $V_{CS}$ of the current sensing circuit 9 reaches the detected voltage $V_f$ of the output-voltage detecting circuit 27, the comparator 18 applies the on-level pulse signal (reset pulse) shown in FIG. 20(e) to the reset input terminal (R) of the RS flip-flop circuit 17. When the RS flip-flop circuit 17 receives the reset pulse, it immediately stops outputting the on-level gate-pulse signal to the switching element 7 as shown in FIG. 21 (f) to turn off the switching element 7.

When the switching element 7 is turned off, a current caused by energy accumulated in the transformer 6 is supplied as the output voltage $V_{out}$ via a loop passing through the secondary coil 4 and the diode 20. At the same time, a current caused by energy accumulated in the third coil 5 during the switch-on period flows through the diode 15 to the IC-input capacitor 14 to charge the capacitor. The circuit is then ready for the next switching on of the switching element 7.

When the output voltage $V_{out}$ rises from the specified voltage $V_a$ to a voltage $V_b$ as shown in FIG. 21 (a), for example, the output voltage $V_c$ of the error amplifier 24 in the output-voltage detecting circuit 27 becomes low as shown in FIG. 21 (b). Then, the detected voltage $V_f$ of the output-voltage detecting circuit 27 is lowered as shown in FIG. 21 (c), and the time period which is taken by the detected voltage $V_{CS}$ of the current sensing circuit 9 to reach the detected voltage $V_f$ becomes shorter. In other words, the time period (the switch-on period of the switching element), from when the RS flip-flop circuit 17 starts outputting an on-level signal to the switching element 7, to when the RS flip-flop circuit 17 receives a reset pulse from the comparator 18, becomes shorter, electromagnetic energy accumulated in the primary coil 3 is reduced, and the rise in the output voltage $V_{out}$ relative to the specified voltage $V_a$ is compensated for, a rise and $V_{out}$ is stabilized.

On the other hand, when the output voltage $V_{out}$ becomes lower than the specified voltage $V_a$, contrary to the operation described above, the switch-on period of the switching element 7 is extended and electromagnetic energy accumulated in the primary coil 3 increases. The decrease in the output voltage $V_{out}$ relative to the specified voltage $V_2$ is compensated for, and is stabilized.

The above-described control method is generally known as the current-mode control method, in which a current passing through the circuit is detected and converted to a voltage, the switch-on period of the switching element 7 is controlled according to the detected voltage and the output voltage, and the output voltage is stabilized. This control method is superior in response and provides stable control against changes in the output voltage $V_{out}$ compared with other methods such as the voltage-mode control method, since the circuit current is used in this method.

However, when the circuit has a light load or receives a high input voltage, a current "i" flowing through the circuit decreases and the ratio of a noise factor to the current "i" inevitably becomes very large. Namely, the S/N ratio of the current "i" largely declines. Since the current sensing circuit 9 converts the current "i," which has a decreased S/N ratio, into a voltage and outputs it as the detected voltage $V_{CS}$, the S/N ratio of the detected voltage $V_{CS}$ is substantially reduced. The switch control circuit 19, which receives the detected voltage $V_{CS}$, cannot correctly control switching on and off of the switching element 7 due to adverse effects of the noise factor in the detected voltage $V_{CS}$. The output voltage $V_{out}$ is not positively stabilized.

SUMMARY OF THE INVENTION

To solve the above-described problem, the present invention is made. Accordingly, it is an object of the present invention to provide a switching power supply of the current-mode control type, which can correctly control switching on and off of the switching element in order to stabilize the output voltage even at a light load or a high input voltage without being adversely affected by a noise factor in the detected voltage of the current sensing circuit.

The foregoing object is achieved according to one aspect of the present invention through the provision of an improvement comprising a superimposition circuit for applying a superimposition current or a superimposition voltage to a current sensing circuit during a switch-on period of a switching element, in a switching power supply having the switching element for supplying an output voltage by a switching-on-and-off operation; a current sensing circuit for converting a current flowing through the circuit into a voltage and for detecting and outputting the voltage; an output-voltage detecting circuit for detecting and outputting an output voltage; and a switch control circuit of the current-mode control type for controlling the switch-on period of the switching element so as to stabilize the output voltage according to the detected voltage of the output-voltage detecting circuit and the detected voltage of the current sensing circuit.

When the superimposition circuit supplies a superimposition current to the current sensing circuit, the current sensing circuit converts the current, in which the superimposition current is superimposed on the circuit current, into a voltage, and applies the voltage to a switch control circuit as a detected voltage. When the superimposition circuit applies a superimposition voltage to the current sensing circuit, the current sensing circuit converts the circuit current into a voltage and applies the voltage plus the superimposition voltage to a switch control circuit as a detected voltage. With the superimposition circuit as described above, since the detected voltage of the current sensing circuit includes the specified superimposition component, when the circuit current becomes low due to a light load or a high input voltage, the S/N ratio of the detected voltage of the current sensing circuit is prevented from decreasing substantially. The switch control circuit controls switching on and off of the switching element without receiving most of the adverse effects of a noise component in the detected voltage of the current sensing circuit, and the output voltage is positively stabilized.

The foregoing object is achieved according to another aspect of the present invention through the provision of an improvement comprising a superimposition circuit for applying both a superimposition current and a superimposition voltage to a current sensing circuit during a switch-on period of a switching element, in a switching power supply having the switching element for supplying an output voltage by a switching-on-and-off operation; a current sensing circuit for converting a current flowing through the circuit into a voltage and for detecting and outputting the voltage; an output-voltage detecting circuit for detecting and outputting an output voltage; and a switch control circuit of the current-mode control type for controlling the switch-on period of the switching element so as to stabilize the output voltage according to the detected voltage of the output-voltage detecting circuit and the detected voltage of the current sensing circuit.

The superimposition circuit applies both the superimposition current and superimposition voltage to the current sensing circuit. The current sensing circuit converts the current in which the superimposition current is added to the circuit current into a voltage, and the voltage plus the superimposition voltage are applied to the switch control circuit as a detected voltage. Therefore, the S/N ratio of the detected voltage in the current sensing circuit is positively prevented from decreasing even at a light load or a high input voltage. The switch control circuit more positively stabilizes the output voltage.

A circuit for supplying a superimposition voltage may be made up of a superimposition diode which generates the superimposition voltage in the above-described improvements.

When the superimposition circuit applies a superimposition voltage to the current sensing circuit, the current sensing circuit converts the circuit current into a voltage and applies the voltage plus the superimposition voltage to the switch control circuit as a detected voltage. The S/N ratio of the detected voltage of the current sensing circuit is positively prevented from decreasing even at a light load or a high input voltage. The switch control circuit positively stabilizes the output voltage. In addition, a power loss at the superimposition diode is very small when a current flows through the diode, and a power loss at the superimposition circuit is substantially reduced.

The switching power supply may further comprise a superimposition control circuit for detecting a circuit current and for controlling the superimposition circuit so as to perform superimposition operation only when the detected current is lower than the specified current.

The superimposition circuit is controlled such that superimposition operation is performed only when the circuit has a light load or receives a high input voltage and the circuit current is reduced below the specified current. Therefore, since the superimposition circuit does not operate in cases other than a case with a light load or a high input voltage, a power loss at the superimposition circuit is made zero in those cases. A power loss at the superimposition circuit is reduced.

When the superimposition circuit supplies the specified superimposition current to the current sensing circuit, the current sensing circuit converts the circuit current plus the superimposition current into a voltage, and detects and outputs it. The output-voltage detecting circuit detects the output voltage and outputs it. Since the detected voltage of the current sensing circuit includes the superimposition component based on the superimposition current and is biased by this superimposition component, the voltage detected by the current sensing circuit becomes larger by including this superimposition component and the S/N ratio of the detected voltage is prevented from decreasing substantially even when the circuit has a light load or receives a high input voltage and the circuit current becomes low. Therefore, the switch control circuit correctly controls switching on and off of the switching element according to the detected voltage of the current sensing circuit and the detected voltage of the output-voltage detecting circuit so as to stabilize the output voltage without receiving adverse effects of the noise component in the detected voltage of the current sensing circuit even at a light load or a high input voltage, and supplies the stable output voltage.

BRIEF DESCRIPTION OF THE DRAWINGS

FIG. 2 is a timing chart indicating current superimposition in a superimposition circuit shown in FIG. 1.

FIG. 5 is a circuit diagram of a switching power supply according to a fourth embodiment of the present invention.

FIG. 6 is a timing chart indicating voltage superimposition in a superimposition circuit shown in FIG. 5.

DETAILED DESCRIPTION OF EMBODIMENTS OF THE INVENTION

Figure 1:
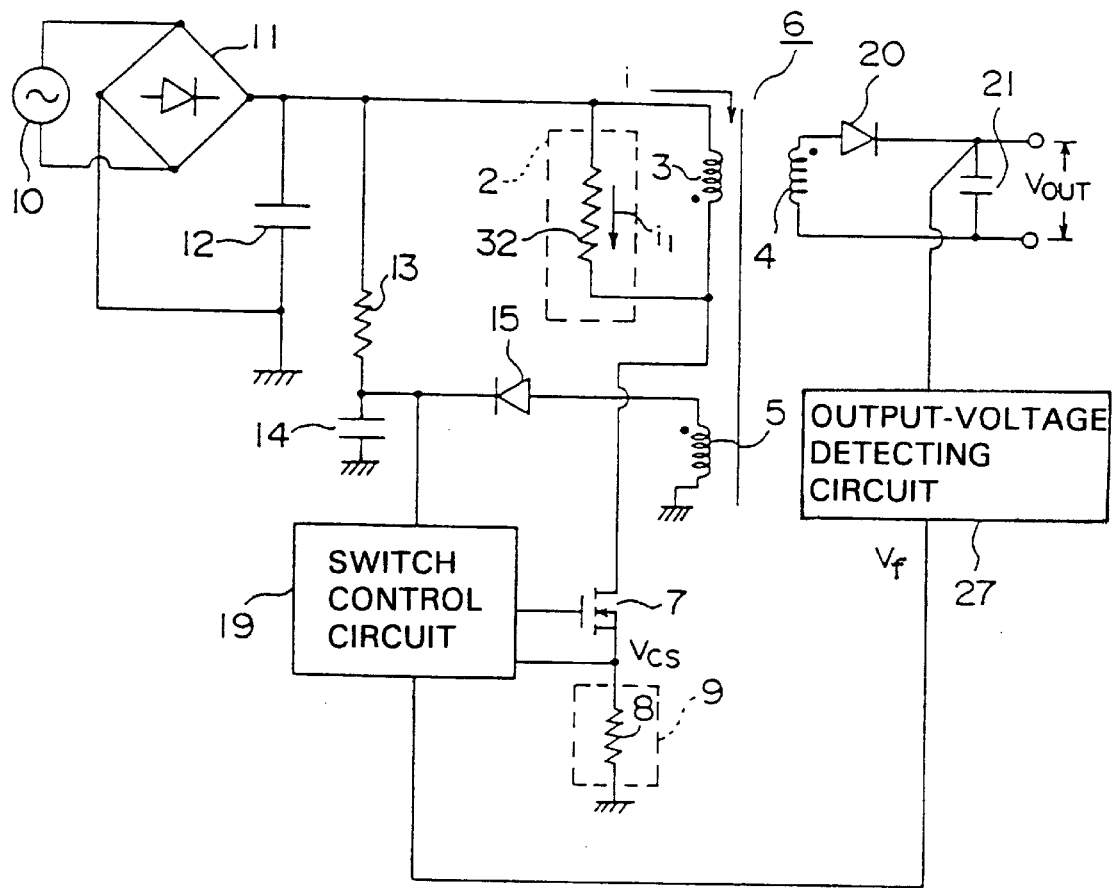
FIG. 1 is a circuit diagram indicating the configuration of a switching power supply according to a first embodiment of the present invention.

Embodiments of the present invention will be described below by referring to the drawings. In the description of each embodiment, the same portions as those in the conventional circuit are designated by the same symbols and the descriptions thereof will be omitted.

Figure 20:
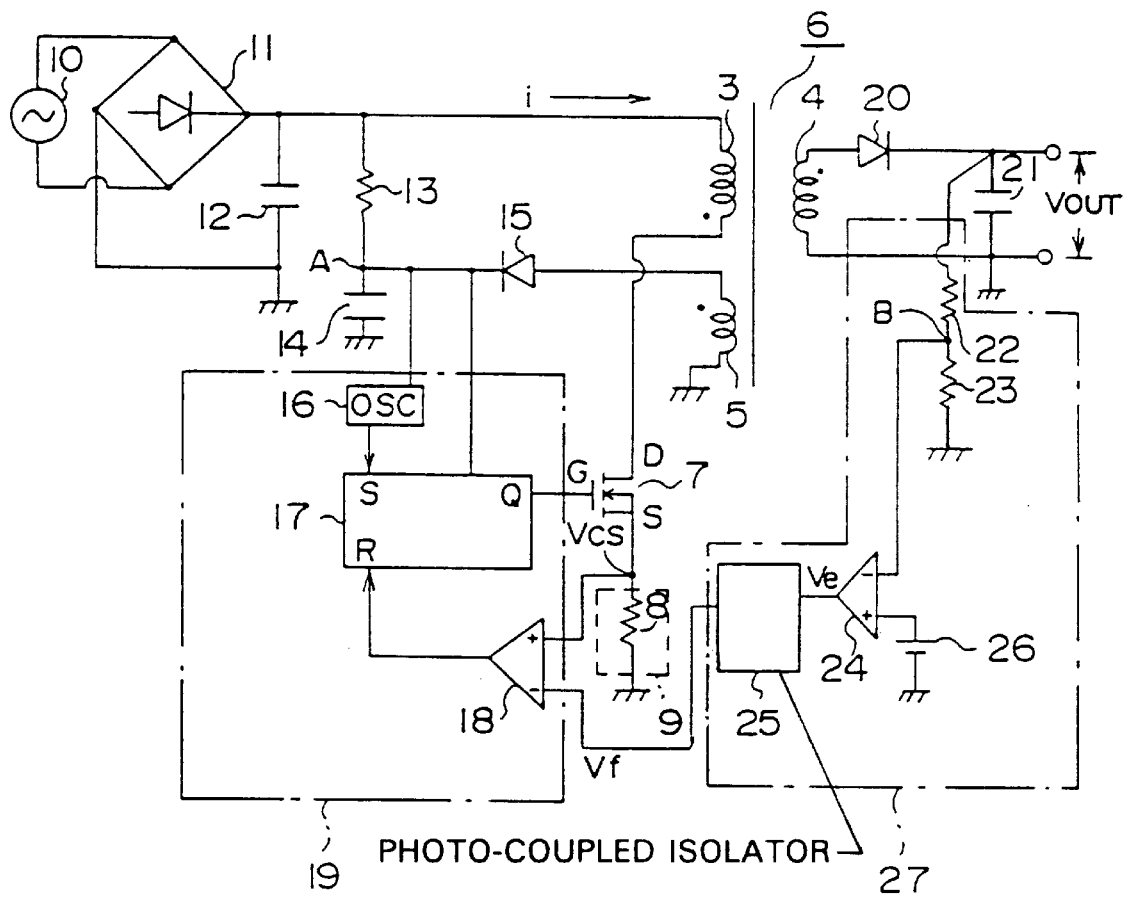
FIG. 20 is a circuit diagram of a conventional switching power supply.
Figure 21A:
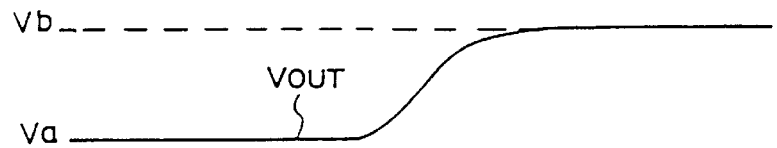
FIG. 21 is a timing chart indicating the operation of the circuit shown in FIG. 20.
Figure 21B:
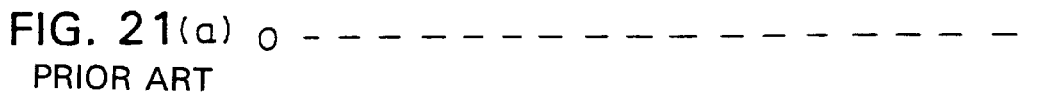
Figure 21C:
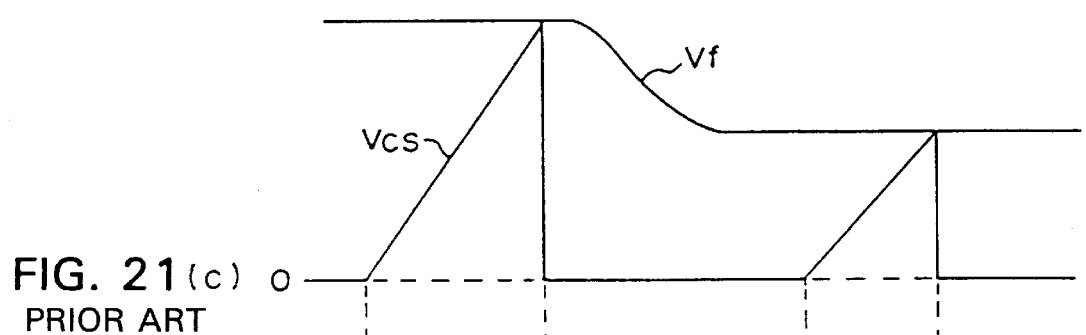
Figure 21D:
Figure 21E:
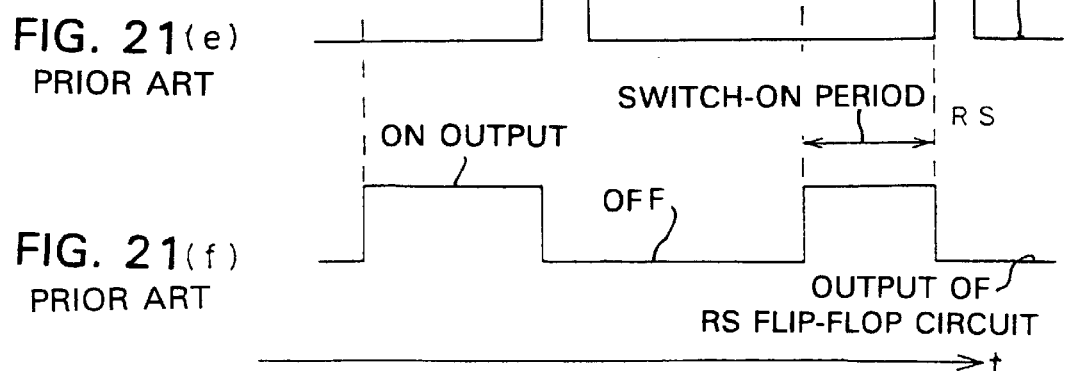
Figure 21F:
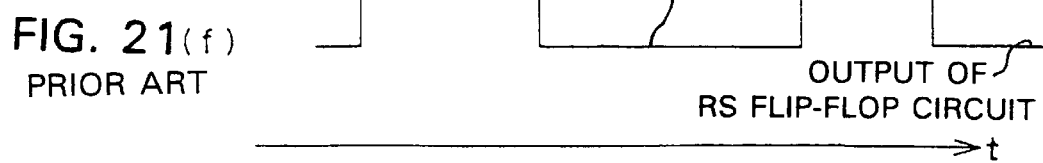

FIG. 1 shows a circuit of a switching power supply according to a first embodiment. In the same way as in the conventional circuit, a switch control circuit 19 shown in FIG. 1 has components which are the same as the OSC 16, the RS flip-flop circuit 17, and the comparator 18 shown in FIG. 20 and is integrated into a chip. The switching operation of a switching element 7 is the same as that described in the conventional circuit. Also in the same way as in the conventional circuit, an output-voltage detecting circuit 27 shown in FIG. 1 has components which are the same as the voltage-dividing resistors 22 and 23, the error amplifier 24, the photo-coupler 25, and the reference power supply 26 shown in FIG. 20. The output voltage is detected in the same way as in the conventional circuit.

The first embodiment differs from the conventional example mainly in that a superimposition circuit 2 made up of a resistor 32 is connected in parallel to a primary coil 3, and a superimposition current "$i_1$" shown in FIG. 2 (c) of the superimposition circuit 2 is added to (superimposed on) a current "i" shown in FIG. 2 (b) which flows through the primary coil 3 during a switch-on period of the switching element 7 and the resultant current "i+$i_1$" flows into a current sensing current 9. The other configuration is the same as that in the conventional example.

The superimposition circuit 2 has the resistor 32 as described above, and supplies the superimposition current "$i_1$" shown in FIG. 2 (c) to the current sensing circuit 9 during a switch-on period of the switching element 7.

In the first embodiment, since the resistor 32 constituting the superimposition circuit 2 is connected in parallel to the primary coil 3, the current "i" flows through the primary coil 3 during a switch-on period of the switching element 7, and the superimposition current "$i_1$" flows into the resistor 32. The superimposition current "$i_1$" from the superimposition circuit 2 is added to the current "i" flowing through the primary coil 3, and the current "i+$i_1$" flows into the current sensing circuit 9. When the circuit has a light load or receives a high input voltage, for example, even if the current "i" flowing through the primary coil 3 decreases to a current "i'" shown in FIG. 2 (b), the current "i'+$i_1$", in which the constant superimposition current "$i_1$" has been added to the current "i" flowing through the primary coil 3, flows into the current sensing circuit 9. Since the current "i" is biased by the superimposition current "$i_1$," the S/N ratio is prevented from becoming worse and the current sensing circuit 9 applies a detected voltage $V_{CS}$ having a good S/N ratio to the switch control circuit 19 even at a light load or a high input voltage. The switch control circuit 19 controls switching on and off of the switching element 7 without receiving most of the adverse effects of a noise factor in the detected voltage $V_{CS}$, and the output voltage $V_{out}$ is positively stabilized.

Figure 3:
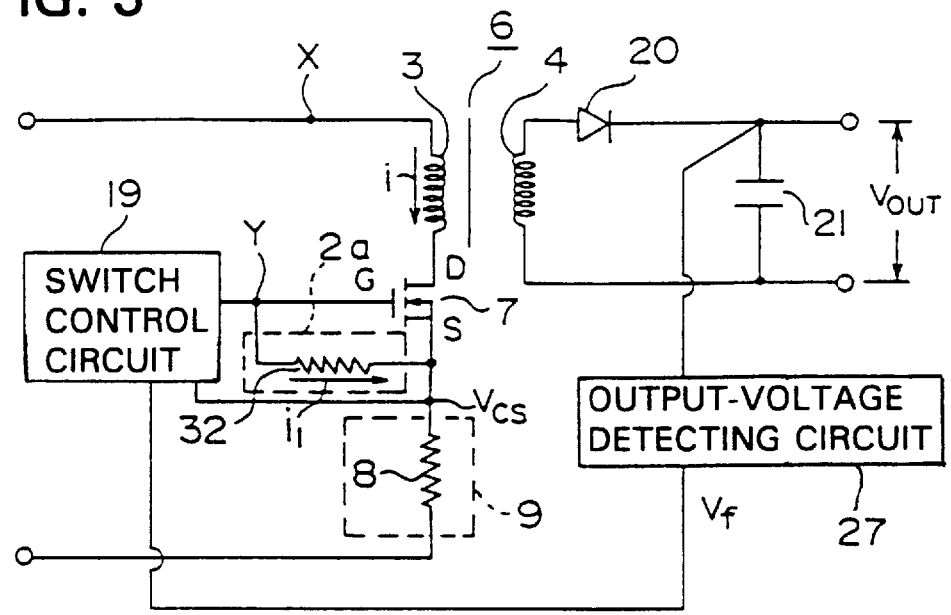
FIG. 3 is a circuit diagram of a switching power supply according to a second embodiment of the present invention.

FIG. 3 shows a second embodiment. The second embodiment differs from the first embodiment mainly in that a superimposition circuit 2a is provided in parallel to the gate G and the source S of the switching circuit 7 in order to reduce a power loss at the superimposition circuit 2a, rather than connecting a superimposition circuit 2 made up of a resistor 32 in parallel to a primary coil 3. The rest of the configuration is the same as that in the first embodiment. Components corresponding to the input power supply 10, the diode bridge circuit 11, the smoothing capacitor 12, the start resistor member 13, the IC-input capacitor 14, the third coil 5, and the diode 15, all shown in FIG. 1, are not shown in FIG. 3.

In the second embodiment, the superimposition circuit 2a applies the specified superimposition current "$i_1$" to the current sensing circuit 9 by means of an on-level output from the switch control circuit 19, applied to the gate G of the switching element 7 during a switch-on period of the switching element 7, and also applied to the current sensing circuit 9 during said switch-on period.

In the second embodiment, in the same way as in the first embodiment, since the superimposition circuit 2 is provided, the current "i" flows through the primary coil 3 during a switch-on period of the switching element 7, and the superimposition current "$i_1$" flows into the resistor 32 constituting the superimposition circuit 2a. The superimposition current "$i_1$" in the superimposition circuit 2a is added to the current "i" flowing through the primary coil 3, and the current "i+$i_1$" flows into the current sensing circuit 9. Therefore, in the same way as in the first embodiment, even when the circuit has a light load or receives a high input voltage, the S/N ratio of the current flowing through the current sensing circuit 9 is prevented from becoming worse by the superimposition current "$i_1$" and the current sensing circuit 9 applies a detected voltage $V_{CS}$ having a good S/N ratio to the switch control circuit 19. The switch control circuit 19 controls switching on and off of the switching element 7 without receiving most of the adverse effects of a noise factor in the detected voltage $V_{CS}$, and the output voltage $V_{out}$ is positively stabilized.

During a switch-on period of the switching element 7, a voltage of about 100 V, for example, appears at point X which is on the input side of the primary coil 3 while a voltage of 10 to 20 V, for example, appears at point Y which is the junction point of the gate of the switching element 7 and the superimposition circuit 2a. In this way, since the voltage at point Y is much lower than that at point X, a power loss in the superimposition circuit 2a can be reduced more in the second embodiment, in which the superimposition circuit 2a is provided in parallel to the gate G and the source S of the switching element 7, than in the first embodiment in which the superimposition circuit 2 is connected in parallel to the primary circuit 3.

Figure 4:
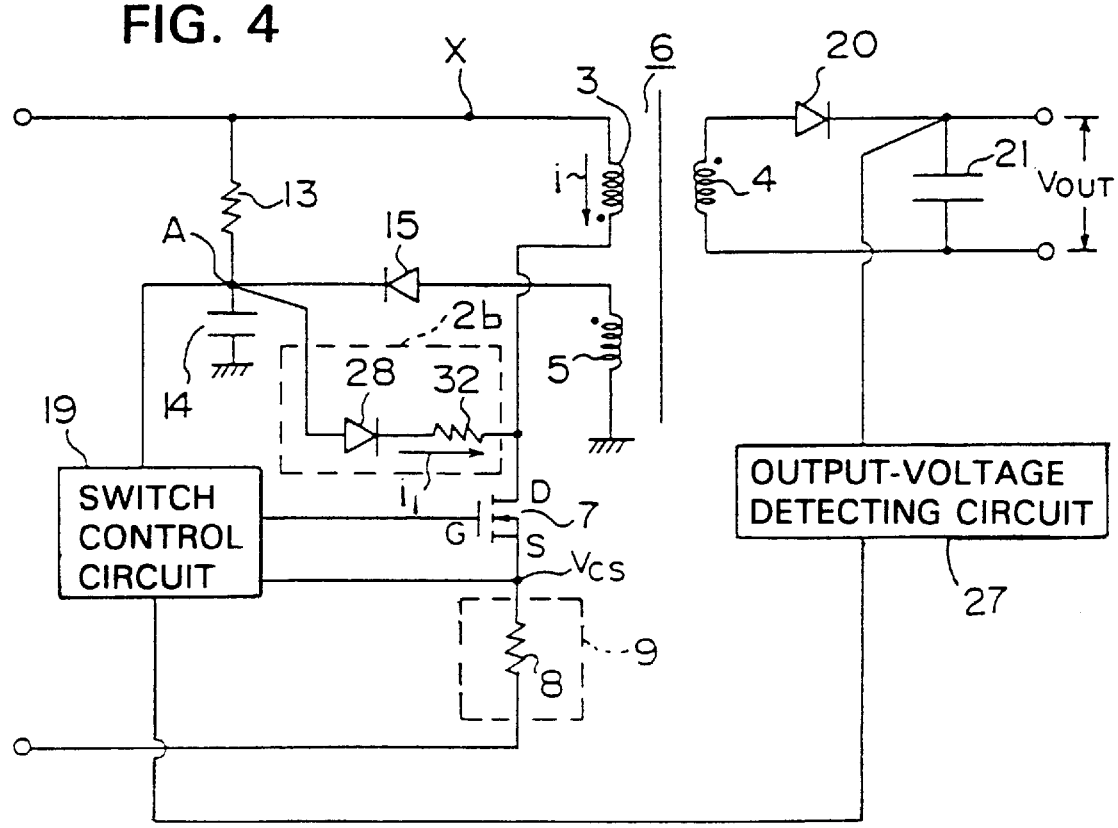
FIG. 4 is a circuit diagram of a switching power supply according to a third embodiment of the present invention.

FIG. 4 shows a third embodiment. In the third embodiment, a superimposition circuit 2b is formed by a series-connection of a diode 28 and a resistor 32. The anode of the diode 28 is connected to point A where a start resistor 13 and an IC-input capacitor 14 are connected in series, and the cathode of the diode 28 is connected to one end of the resistor 32. The other end of the resistor 32 is connected to the drain D of a switching element 7. The configuration of the circuits other than the superimposition circuit 2b is the same as that in the first and second embodiments. Components corresponding to the input power supply 10, the diode bridge circuit 11, and the smoothing capacitor 12 all shown in FIG. 1 are not shown in FIG. 4.

The superimposition circuit 2b shown in FIG. 4 supplies the specified superimposition current "$i_1$" to a current sensing circuit 9 in response to a charged voltage in the IC-input capacitor 14. In the same way as in the first and second embodiments, since the current "i+$i_1$" in which the superimposition current "$i_1$" in the superimposition circuit 2b is added to the current "i" flowing through the primary coil 3 flows into the current sensing circuit 9 during a switch-on period, even when the circuit has a light load or receives a high input voltage, the current sensing circuit 9 outputs a detected voltage $V_{CS}$ having a good S/N ratio and the output voltage $V_{out}$ is positively stabilized. Also in the same way as in the second embodiment, since the voltage at point A at the input side of the superimposition circuit 2 is lower than that at point X at the input side of the primary coil 3, a power loss at the superimposition circuit 2b is reduced more in this embodiment than in the first embodiment.

FIG. 5 shows a fourth embodiment. In the fourth embodiment, a superimposition circuit 2c has a capacitor 30 and transistors 34 and 35, and a superimposition voltage $V_C$ shown in FIG. 6 (c) is applied to a current sensing circuit 9 during a switch-on period of a switching element 7. The configuration of circuits other than the superimposition circuit 2 is the same as that in each of the above-described embodiments and the description thereof will be omitted. Components corresponding to the input power supply 10, the diode bridge circuit 11, the smoothing capacitor 12, the start resistor member 13, the IC-input capacitor 14, the diode 15, and the third coil 5 all shown in FIG. 1 are not shown in FIG. 5.

The superimposition circuit 2c, shown in FIG. 5, including the capacitor 30 and the transistors 34 and 35 as described above is connected to a power supply different from the input power supply 10 at point P and is provided in parallel to the gate G and the source S of the switching circuit 7. The voltage across the capacitor 30 becomes the specified voltage $V_C$ shown in FIG. 6 (c) during a switch-on period of the switching element 7, and the superimposition circuit 2c applies the voltage $V_C$ as a superimposition voltage to the current sensing circuit 9. Therefore, the current sensing circuit 9 applies to a switch control circuit 19 the detected voltage $V_{CS}$ which is shown in FIG. 6 (d) and generated by adding the superimposition voltage $V_C$ of the superimposition circuit 2c to the voltage corresponding to the current "i" which is shown in FIG. 6 (b) and passes through the primary coil 3. Since the detected voltage $V_{CS}$ includes a bias voltage, that is the superimposition voltage $V_C$, even if the circuit has a light load or receives a high input voltage, the S/N ratio of the detected voltage $V_{CS}$ is prevented from becoming worse, due to this superimposition voltage $V_C$.

In the fourth embodiment, in the same way as in each of the above-described embodiments, since the superimposition circuit 2c shown in FIG. 5 is provided, even when the circuit has a light load or receives a high input voltage, the S/N ratio of the detected voltage $V_{CS}$ is prevented from becoming worse. The switch control circuit 19 controls switching on and off of the switching element 7 without receiving adverse effects of the noise factor and the output voltage $V_{out}$ is positively stabilized. Since the superimposition circuit 2c is provided in parallel to the gate G and the source S of the switching element 7 in the fourth embodiment, a power loss at the superimposition circuit is reduced more than in the first embodiment, in the same way as in the second embodiment.

Figure 7:
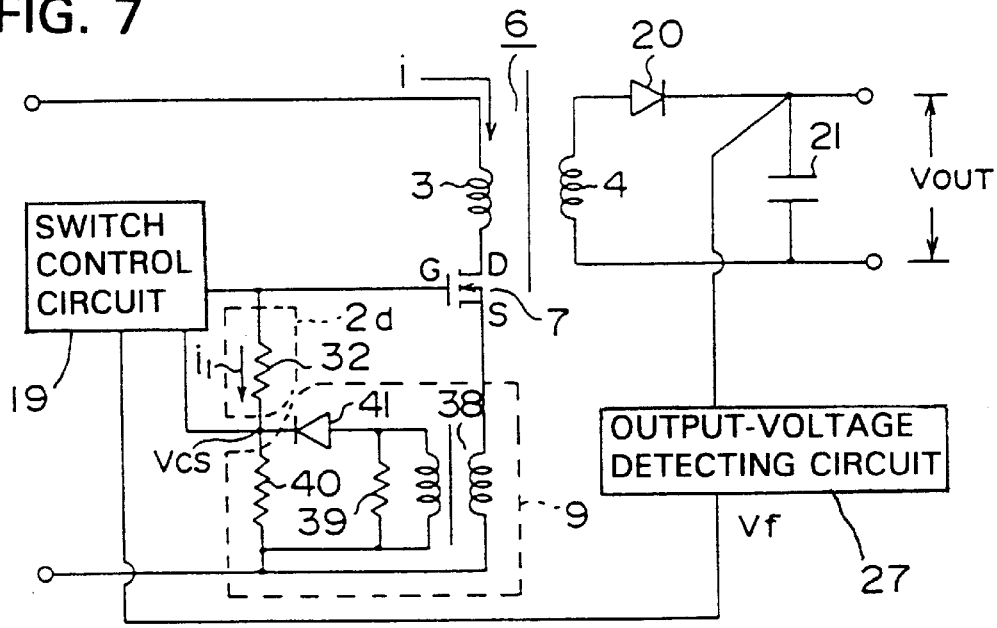
FIG. 7 is a circuit diagram of a switching power supply according to a fifth embodiment of the present invention.

FIG. 7 shows a fifth embodiment. In the fifth embodiment, a current sensing circuit 9 includes a current transformer 38, a reset resistor 39, a sensing resistor 40, and a rectifying diode 41. FIG. 7 shows a case in which a switching power supply having such a current sensing circuit is provided with a superimposition circuit 2d. In the current sensing circuit 9, as is well known, the current "i" flowing into a primary coil 3 flows through the primary coil of the current transformer 38 during a switch-on period of the switching element 7, and a current is induced at the secondary coil of the current transformer 38. The secondary-coil current flows into the sensing resistor 40 through the rectifying diode 41 and is converted to a voltage. The voltage is output as a detected voltage $V_{CS}$. The configuration of circuits other than the current sensing circuit 9 and the superimposition circuit 2d is the same as that in each of the above-described embodiments, and the descriptions thereof will be omitted.

The superimposition circuit 2d shown in FIG. 7 has a resistor 32 and is provided between the gate G of the switching element 7 and the sensing resistor 40 of the current sensing circuit 9. The specified superimposition current "$i_1$" is supplied to the sensing resistor 40 in the current sensing circuit 9 during a switch-on period of the switching element 7 due to an on-level output applied to the gate G of the switching element 7 from the switch control circuit 19.

In the fifth embodiment, the superimposition current "$i_1$" is supplied to the sensing resistor 40 of the current sensing circuit 9 during a switch-on period of the switching element 7. This means that the current in which the superimposition current "$i_1$" is added to the current flowing through the secondary coil of the current transformer 38 which corresponds to the current "i" flowing through the primary coil 3 flows through the sensing resistor 40. Even when the secondary current of the current transformer 38 becomes low due to a light load or a high input voltage in the circuit, since the current flowing through the sensing resistor 40 is biased by the superimposition current "$i_1$" to become higher, the S/N ratio of the detected voltage $V_{CS}$ of the current sensing circuit 9 is prevented from decreasing in a light load or a high input voltage in the same way as in each of the above-described embodiments. The output voltage $V_{out}$ is positively stabilized even with a light load or a high input voltage. Since the input of the superimposition circuit 2d is connected to the gate G of the switching element 7, a power loss at the superimposition circuit is reduced in the same way as in the second embodiment.

Figure 8:
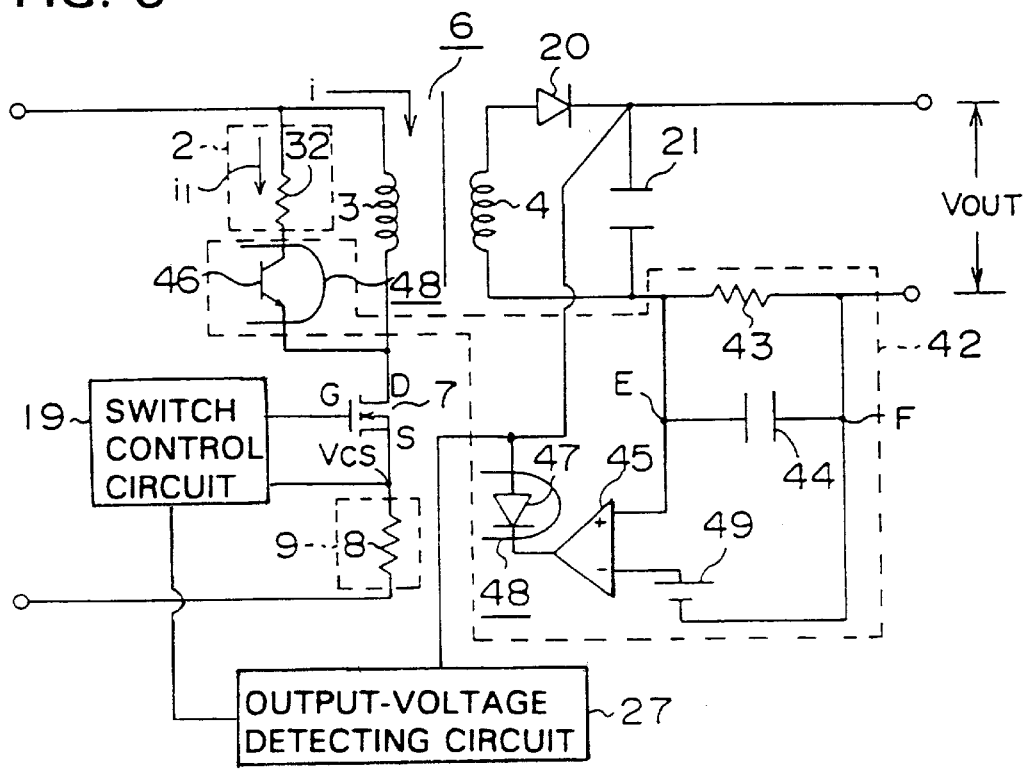
FIG. 8 is a circuit diagram of a switching power supply according to a sixth embodiment of the present invention.

FIG. 8 shows a sixth embodiment. The sixth embodiment differs from the first embodiment mainly in that a superimposition control circuit 42 is provided. The superimposition control circuit 42 controls the superimposition circuit 2 such that the circuit 2 performs superimposition only when the circuit current is reduced below the specified current (namely, only at a light load or a high input voltage), in order to make a power loss at the superimposition circuit 2 zero in cases other than a light load or a high input voltage. The other configuration is the same as that in the first embodiment.

The superimposition control circuit 42 includes a resistor 43, a capacitor 44, a comparator 45, a switching element 48 made up of a phototransistor 46 and a photodiode 47 constituting a photo-coupler, and a reference power supply 49. As shown in FIG. 8, point E where the resistor 43 and the capacitor 44 are connected in parallel is connected to the non-inverting input terminal of the comparator 45, and point F where the resistor 43 and the capacitor 44 are connected in parallel is connected to the inverting input terminal of the comparator 45 through the reference power supply 49. The output of the comparator 45 is connected to the photodiode 47 of the switching element 48 (photo-coupler isolator), and the phototransistor 46 of the switching element 48 is provided at the output of the superimposition circuit 2.

In the superimposition control circuit 42, the resistor 43 detects and converts the circuit current into a voltage, and the comparator 45 applies a voltage based on the difference between the detected voltage (namely, the voltage across the parallel-connection section of the resistor 43 and the capacitor 44) and the reference voltage supplied from the reference power supply 49 and specified in advance, to the switching element 48. In this embodiment, when the detected voltage is lower than the reference voltage, in other words, only when the circuit has a light load or receives a high input voltage and the circuit current decreases below the specified current, the photodiode 47 is turned on due to an output decrease of the comparator 45 and the phototransistor 46 is turned on (namely, the switching element 48 is turned on). When the switching element 48 is turned on, the superimposition current "$i_1$" flows through the superimposition circuit 2, the superimposition current "$i_1$" is added to the current "i" flowing through the primary coil 3, and the current "$i+i_1$" flows into the current sensing circuit 9 during a switch-on period of the switching element 7, in the same way as in the first embodiment.

In the sixth embodiment, since the superimposition control circuit 42 is provided and the superimposition circuit 2 is controlled such that the circuit 2 performs current superimposition only when the circuit has a light load or receives a high input voltage and the circuit current is reduced below the specified value, a power loss at the superimposition circuit 2 is eliminated in cases other than a light load or a high input voltage. A power loss at the superimposition circuit 2 is reduced. In the same way as in the first embodiment, the output voltage $V_{out}$ is positively stabilized even at a light load or a high input voltage.

Figure 9:
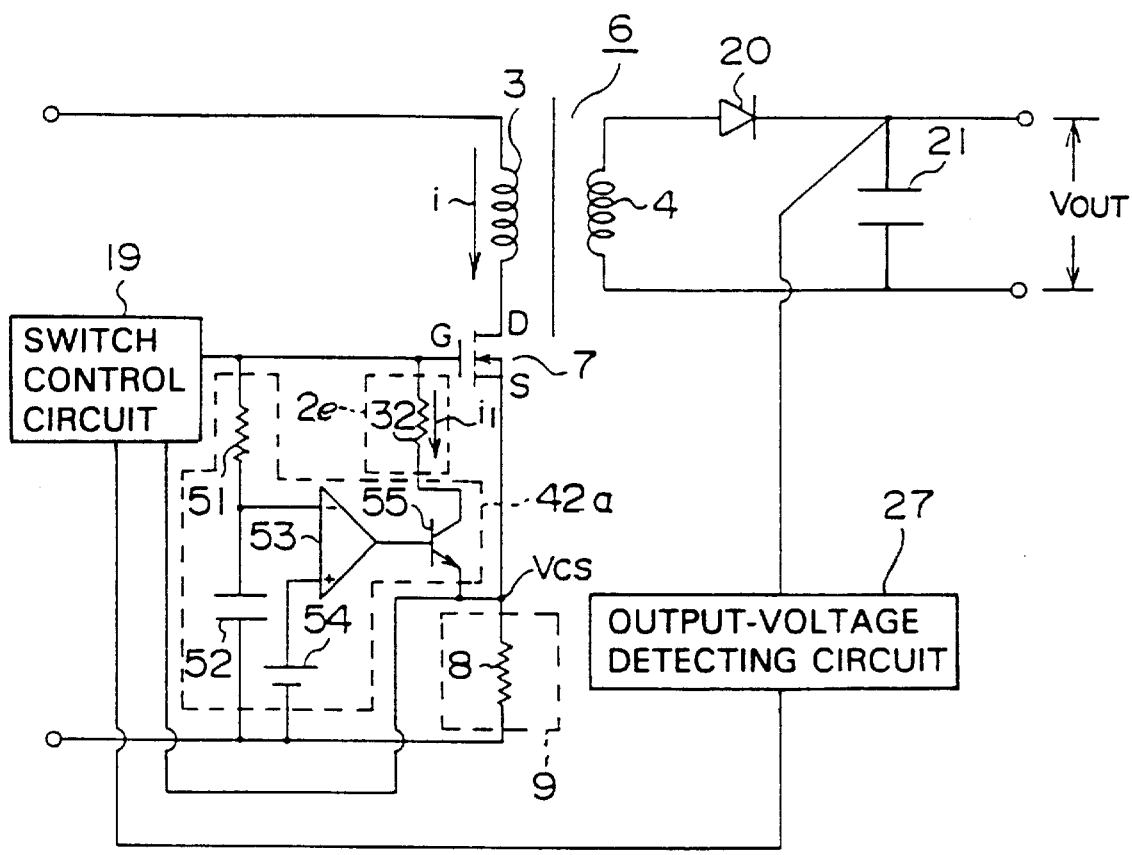
FIG. 9 is a circuit diagram of a switching power supply according to a seventh embodiment of the present invention.

FIG. 9 shows a seventh embodiment. In the seventh embodiment, a superimposition control circuit 42a is provided in addition to the configuration according to the second embodiment, and the superimposition circuit 2e is controlled such that it performs current superimposition only at a light load and a high input voltage. The configuration of circuits other than the superimposition control circuit 42a is the same as that in the second embodiment, and the descriptions thereof will be omitted.

The superimposition control circuit 42a includes a resistor 51, a capacitor 52, a comparator 53, a reference power supply 54, and a transistor 55. An integrating circuit made up of the resistor 51 and the capacitor 52 integrates the gate voltage of the switching element 7 during a switch-on period of the switching element 7. When the integral value (integrated voltage) is lower than the reference voltage specified in advance in the reference power supply 54, in other words, when the circuit has a light load or receives a high input voltage and the pulse width of the gate pulse signal for the switching element 7 becomes short so as to make the switching-on period of the switching element 7 short in order to stabilize the output voltage $V_{out}$, the transistor 55 is turned on and the superimposition current "$i_1$" is supplied to the current sensing circuit 9. Current superimposition is performed in this way in the superimposition circuit 2e.

In the seventh embodiment, since the superimposition control circuit 42a is provided in addition to the configuration according to the second embodiment, the same superior advantages as those in the second embodiment are obtained and a power loss at the superimposition circuit 2e is eliminated in cases other than a light load or a high input voltage. A power loss at the superimposition circuit 2e is further reduced.

Figure 10:
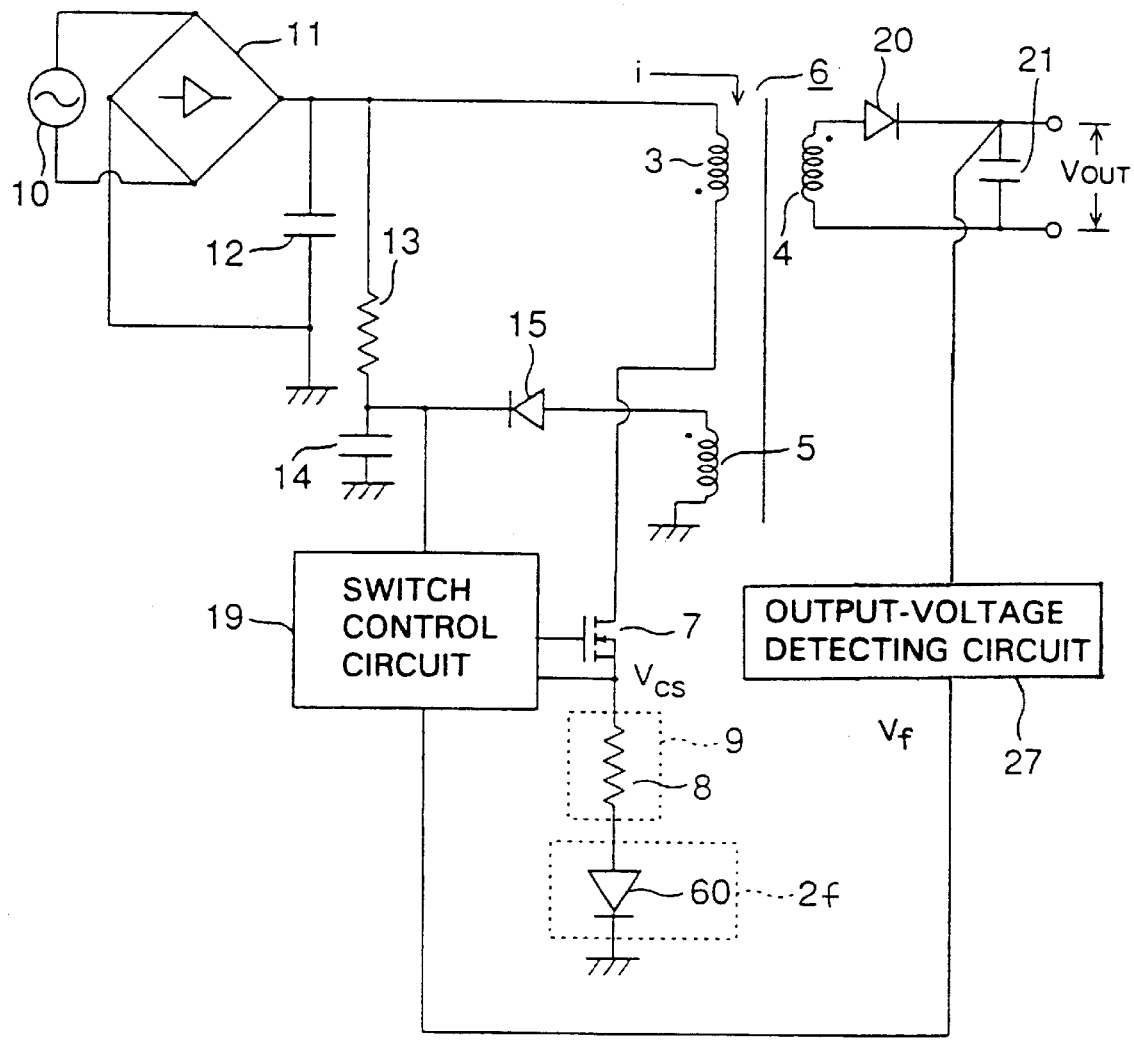
FIG. 10 is a circuit diagram of a switching power supply according to an eighth embodiment of the present invention.

FIG. 10 shows an eighth embodiment. The eighth embodiment features a superimposition circuit 2f made up of a superimposition diode 60. The superimposition circuit 2 applies a superimposition voltage $V_d$ shown in FIG. 11 (c) to a current sensing circuit 9 during a switch-on period of the switching element 7. The configuration of circuits other than the superimposition circuit 2f is the same as that in each of the above-described embodiments, and the description thereof will be omitted.

Figure 11:
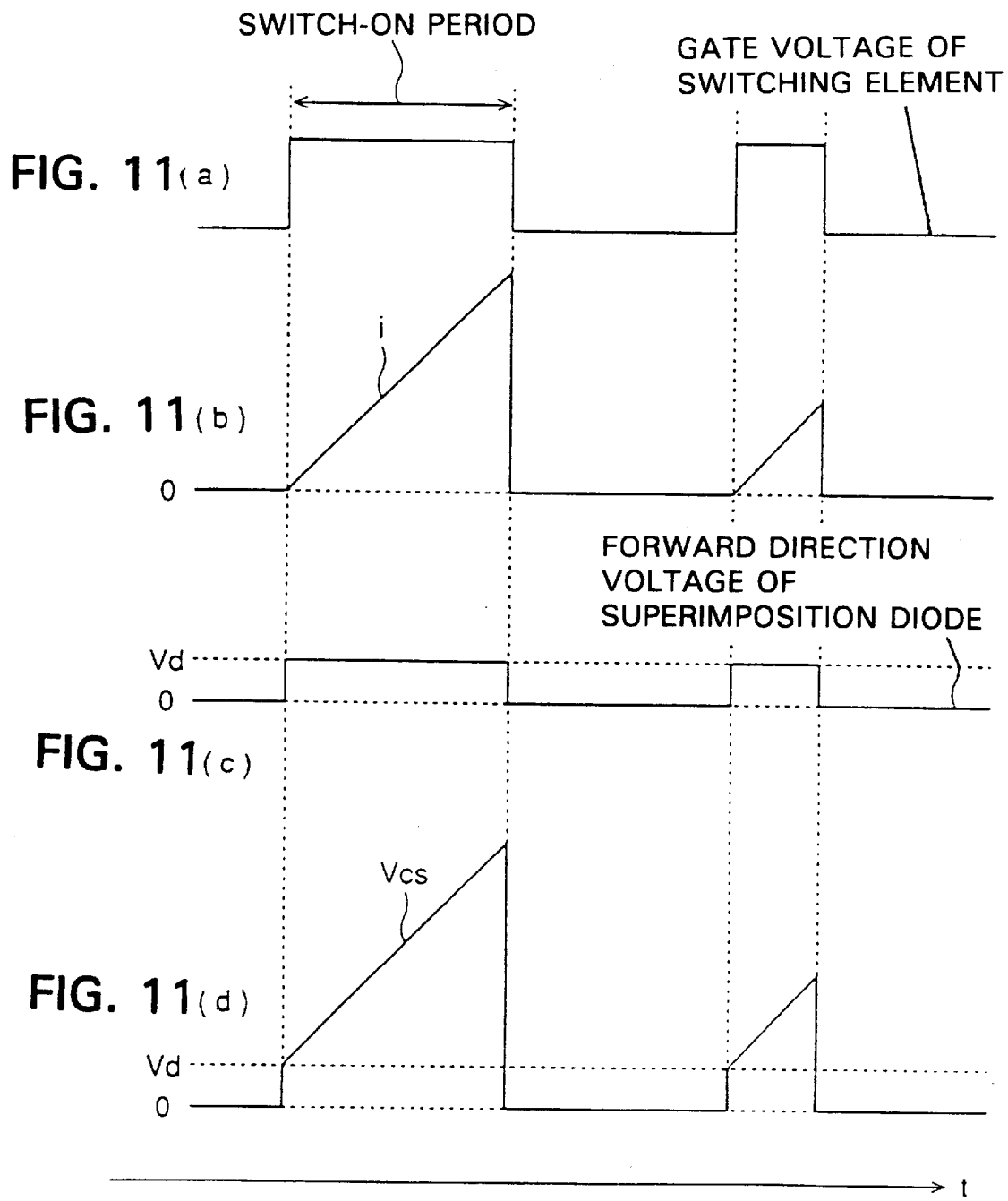
FIG. 11 is a timing chart indicating voltage superimposition in a superimposition circuit shown in FIG. 10.

As described above, the superimposition circuit 2f includes the superimposition diode 60. The anode of the superimposition diode 60 is connected to the ground side of a resistor 8 of the current sensing circuit 9, and the cathode of the superimposition diode 60 is connected to ground. During a switch-on period of the switching element 7, a forward-direction voltage $V_d$ specified in advance is applied to the superimposition diode 60 and the forward-direction voltage $V_d$ is applied to the current sensing circuit 9 as a superimposition voltage. Therefore, during a switch-on period of the switching element 7, the current sensing circuit 9 outputs the detected voltage $V_{CS}$ which is biased by the superimposition voltage $V_d$ as shown in FIG. 11 (d) to a switch control circuit 19.

According to the eighth embodiment, since the superimposition circuit 2f made up of the superimposition diode 60 is provided, the superimposition voltage $V_d$ is applied to the current sensing circuit 9 during a switch-on period of the switching element 7. Therefore, in the same way as in the above-described embodiments, the S/N ratio of the detected voltage $V_{CS}$ in the current sensing circuit 9 is prevented from becoming worse even at a light load or a high input voltage. The switch control circuit 19 controls switching on and off of the switching element 7 without receiving adverse effects of noise existing in the detected voltage $V_{CS}$, and the output voltage $V_{out}$ is acceptably stabilized.

In the circuit configuration shown in FIG. 10, a power loss $P_1$ occurring in the superimposition circuit 2f and the current sensing circuit 9 during a switch-on period of the switching element 7 is expressed by the following equation (1).

$$P_1 = i^2 \cdot R_8 + i \cdot V_d \qquad (1)$$

where i indicates the current flowing through the superimposition circuit 2f and the current sensing circuit 9 during a switch-on period of the switching element 7, $R_8$ indicates the resistance of the resistor 8 in the current sensing circuit 9, and $V_d$ indicates the forward-direction voltage applied to the superimposition diode 60 during a switch-on period of the switching element 7.

In contrast, a power loss $P_2$ occurring in the superimposition circuit 2 and the current sensing circuit 9 of the circuit shown in FIG. 1 is expressed by the following equation (2).

$$P_2 = (i+i_1)^2 \cdot R_8 + i_1^2 \cdot R_{32} \qquad (2)$$

where i indicates the current flowing through the resistor 8 of the current sensing circuit 9, $i_1$ indicates the current (superimposition current) flowing through the resistor 32 in the superimposition circuit 2, $R_8$ indicates the resistance of the resistor 8, and $R_{32}$ indicates the resistance of the resistor 32.

When the magnitude of the superimposition factor in the detected voltage $V_{CS}$ in the current sensing circuit 9 is the same in FIG. 1 and FIG. 10, namely, when $V_d = i \cdot R_8$, the following expression (3) is satisfied.

$$P_2 - P_1 = i \cdot i_1 \cdot R_8 + i_1^2 \cdot R_8 + i_1^2 \cdot R_{32} > 0 \qquad (3)$$

This means that the power loss can be reduced more in the circuit shown in FIG. 10 than the circuit shown in FIG. 1. When $R_8 = 3\Omega$, $V_d = 300$ mV, $R_{32} = 1$ k$\Omega$, i=200 mA, $i_1 = 100$ mA, and the on-level duty cycle (ratio of a switch-on period to the switching period) in the switching element 7 is 0.5, the power loss $P_1$ in the circuit shown in FIG. 10 is as very low as 0.09 W while the power loss $P_2$ in FIG. 1 is 5.1 W.

As described above, the eighth embodiment obtains the same superior advantages as in the above-described embodiments, and substantially reduces the power loss.

Figure 12:
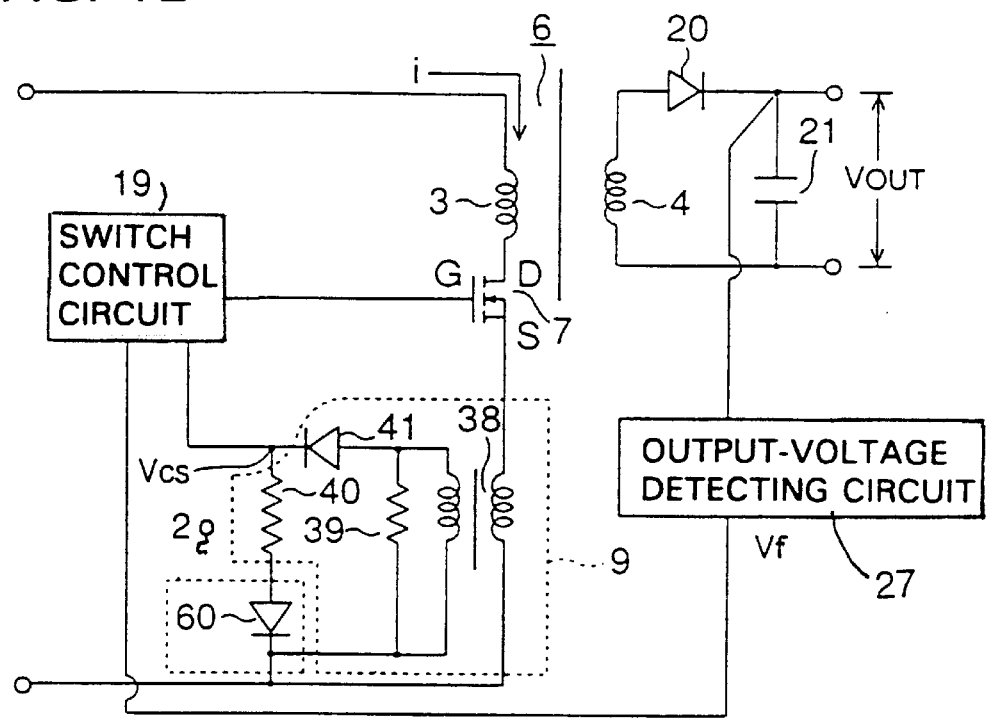
FIG. 12 is a circuit diagram of a switching power supply according to a ninth embodiment of the present invention.

FIG. 12 shows a ninth embodiment. In the ninth embodiment, a switching power supply having the current sensing circuit 9 shown in FIG. 7 is provided with a superimposition circuit 2g made up of a superimposition diode 60. The other configuration is the same as that of the above-described embodiments, and the description thereof will be omitted.

In this embodiment, the superimposition circuit 2g is made up of the superimposition diode 60 as described above. The anode of the superimposition diode 60 is connected to the ground side of a sensing resistor 40 of the current sensing circuit 9 so that the forward-direction voltage $V_d$ specified in advance is applied during a switch-on period of the switching element 7. The superimposition circuit 2g applies the forward-direction voltage of the superimposition diode to the current sensing circuit 9 as a superimposition voltage $V_d$ during a switch-on period of the switching element 7. (See FIG. 13.) The current sensing circuit 9 outputs the detected voltage $V_{CS}$ which is biased by the superimposition voltage $V_d$ to a switch control circuit 19 in the same way as in the above-described embodiments.

According to the ninth embodiment, since the superimposition circuit 2g is provided and the superimposition voltage is applied to the current sensing circuit 9, the S/N ratio of the detected voltage $V_{out}$ of the current sensing circuit 9 is prevented from decreasing even at a light load or a high input voltage, in the same way as in the above-described embodiments. Hence, the switch control circuit 19 satisfactorily stabilizes the output voltage $V_{out}$. Since the superimposition circuit 2g is made up of the superimposition diode 60 in the same way as in the eighth embodiment, a power loss is reduced to a very low level.

A tenth embodiment will be described below. In the tenth embodiment, a superimposition circuit 2h is made up of both a resistor 32 and a superimposition diode 60 as shown in FIGS. 14, 15, 16, 17, 18, and 19, whereby a superimposition current and a superimposition voltage are applied together to a current sensing circuit 9. The other configuration is the same as that in the above-described embodiments, and the description thereof will be omitted.

In this embodiment, the superimposition circuit 2h is made up of the resistor 32 and the superimposition diode 60 as described above. The resistor 32 supplies a superimposition current "$i_1$" to the current sensing circuit 9, and the superimposition diode 60 applies a superimposition voltage $V_d$ to the current sensing circuit 9.

According to the tenth embodiment, since the superimposition circuit 2h is provided in order to apply the superimposition current "$i_1$" and the superimposition voltage $V_d$ to the current sensing circuit 9, the current sensing circuit 9 converts a current which is biased by the superimposition current "$i_1$" to a voltage, and outputs the voltage plus the superimposition voltage $V_d$ to a switch control circuit 19 as a detected voltage $V_{CS}$. Therefore, the S/N ratio of the detected voltage $V_{CS}$ is positively prevented from decreasing even at a light load or a high input voltage. The current sensing circuit 9 applies a detected voltage $V_{CS}$ having a satisfactory S/N ratio to the switch control circuit 19. The switch control circuit 19 more positively stabilizes the output voltage $V_{out}$.

As described above, since the superimposition circuit 2h applies the superimposition current "$i_1$" and the superimposition voltage $V_d$ to the current sensing circuit 9, the superimposition current "$i_1$" can be reduced compared with a case in which only the resistor 32 is provided. When the superimposition current "$i_1$" is reduced, a power loss at the resistor 32 is reduced. A power loss at the superimposition circuit 2h and the current sensing circuit 9 shown in FIG. 14, for example, can be reduced to as very low as one hundredth that of the superimposition circuit 2 and the current sensing circuit 9 shown in FIG. 1.

Figure 18:
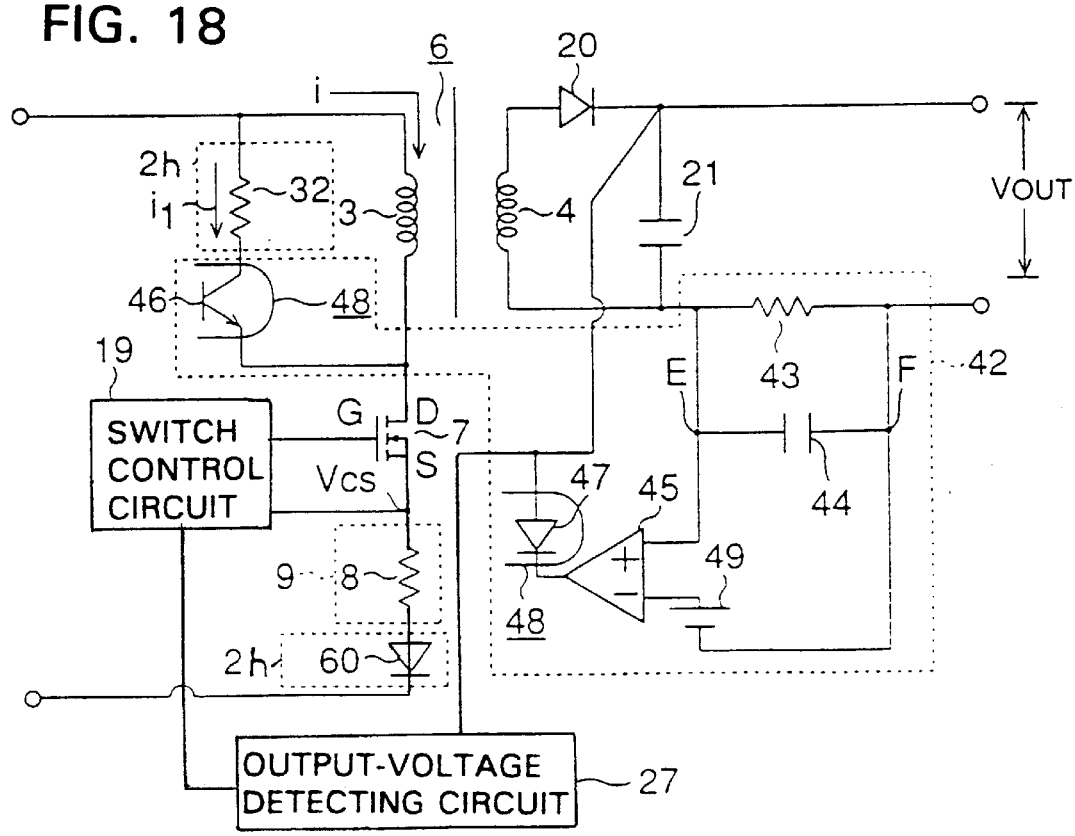
FIG. 18 is a circuit diagram of a superimposition circuit which applies a superimposition current and a superimposition voltage to a current sensing circuit, according to a still further embodiment of the present invention.
Figure 19:
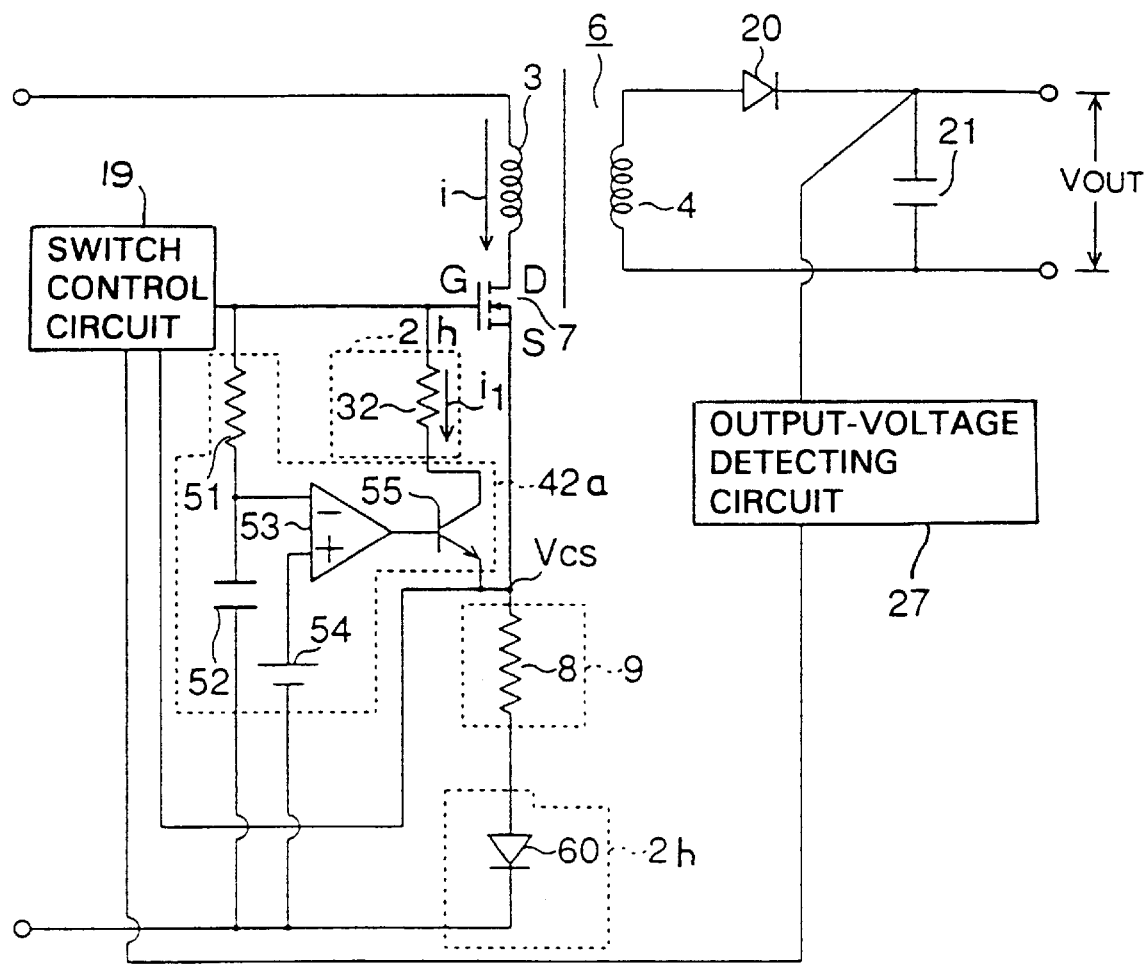
FIG. 19 is a circuit diagram of a superimposition circuit which applies a superimposition current and a superimposition voltage to a current sensing circuit, according to yet another embodiment of the present invention.

When a superimposition control circuit 42 or 42a is shown in FIG. 18 or 19 is provided in the same way as in the sixth and seventh embodiments (FIGS. 8 and 9), since no current flows through a resistor 32 in a normal operation other than that with a light load or a high input voltage because of the operation of the superimposition control circuit 42 or 42a, a power loss at the resistor 32 is made zero in normal operation. The power loss is thereby further reduced.

Figure 13:
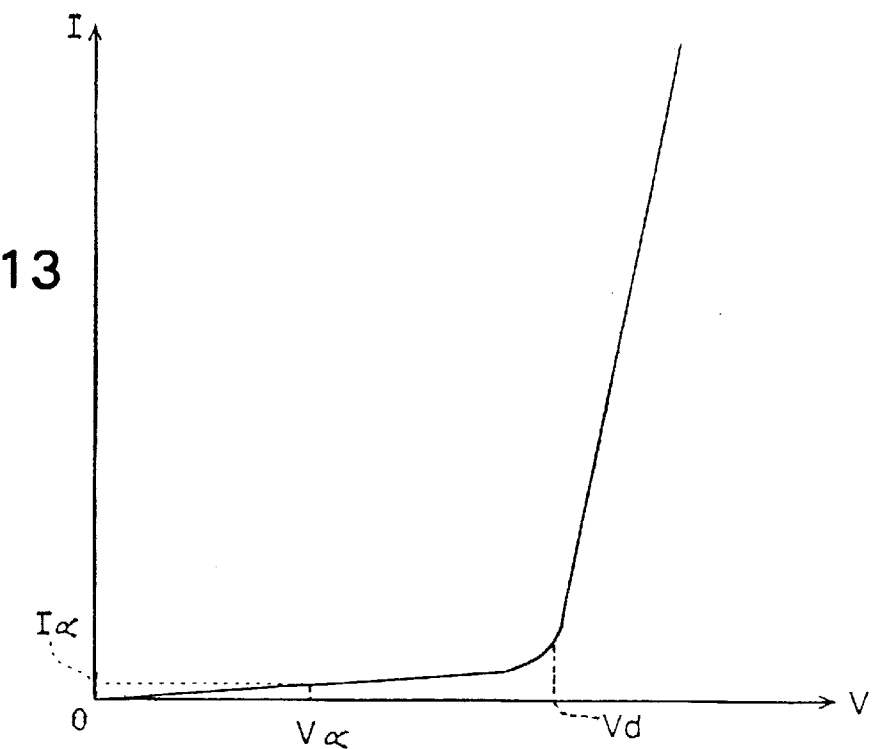
FIG. 13 is a graph indicating the relationship between the forward-direction voltage of a diode and the current flowing through the diode.
Figure 14:
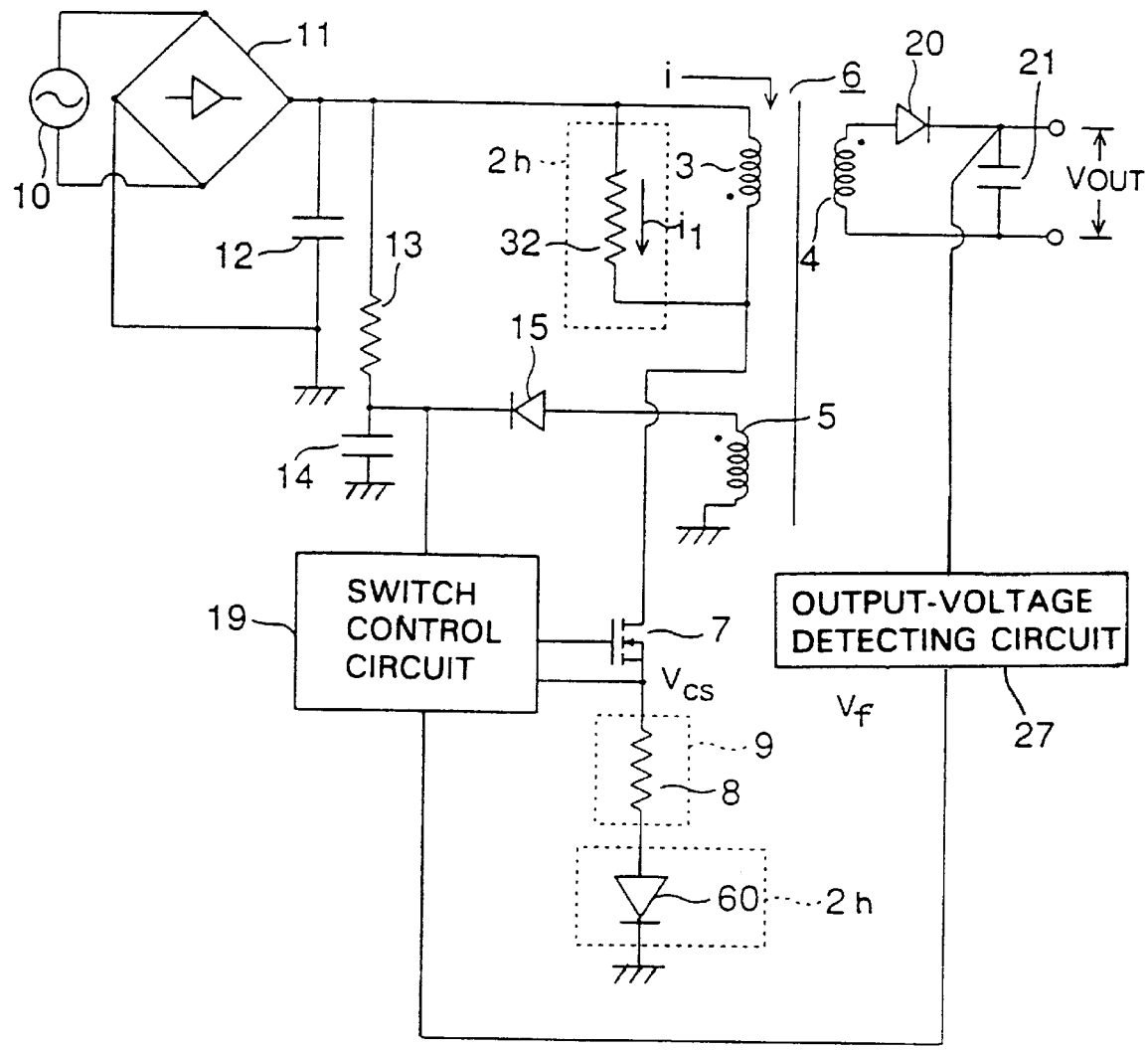
FIG. 14 is a circuit diagram of a superimposition circuit which applies a superimposition current and a superimposition voltage to a current sensing circuit, according to a tenth embodiment of the present invention.
Figure 15:
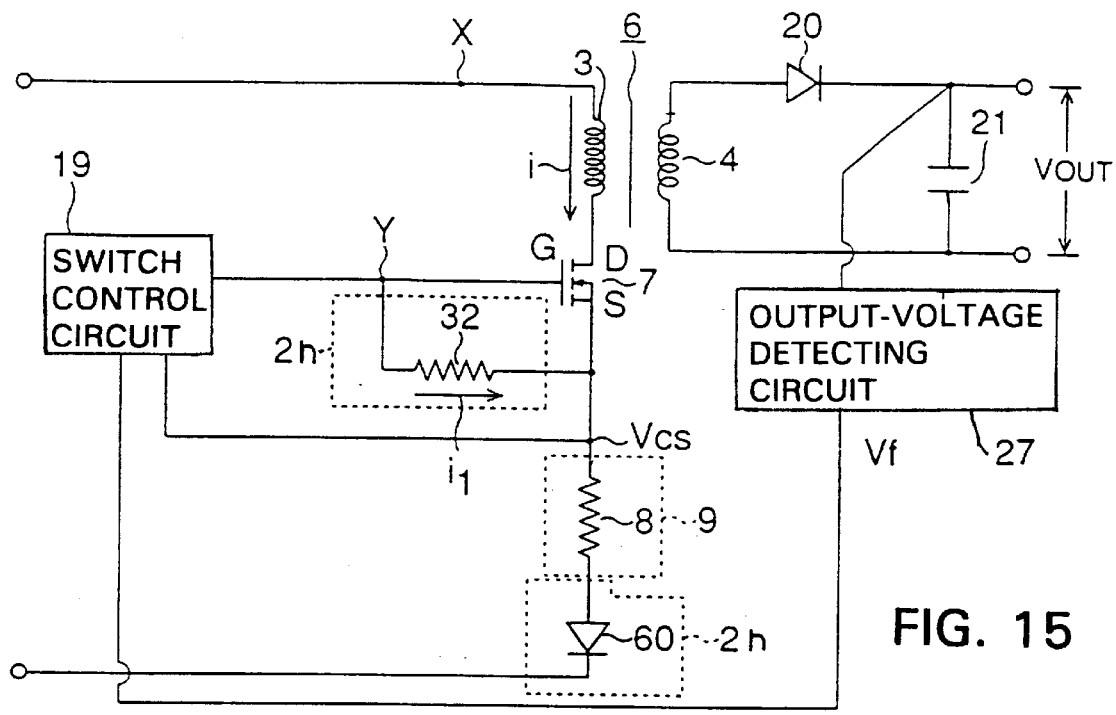
FIG. 15 is a circuit diagram of a superimposition circuit which applies a superimposition current and a superimposition voltage to a current sensing circuit, according to another embodiment of the present invention.
Figure 16:
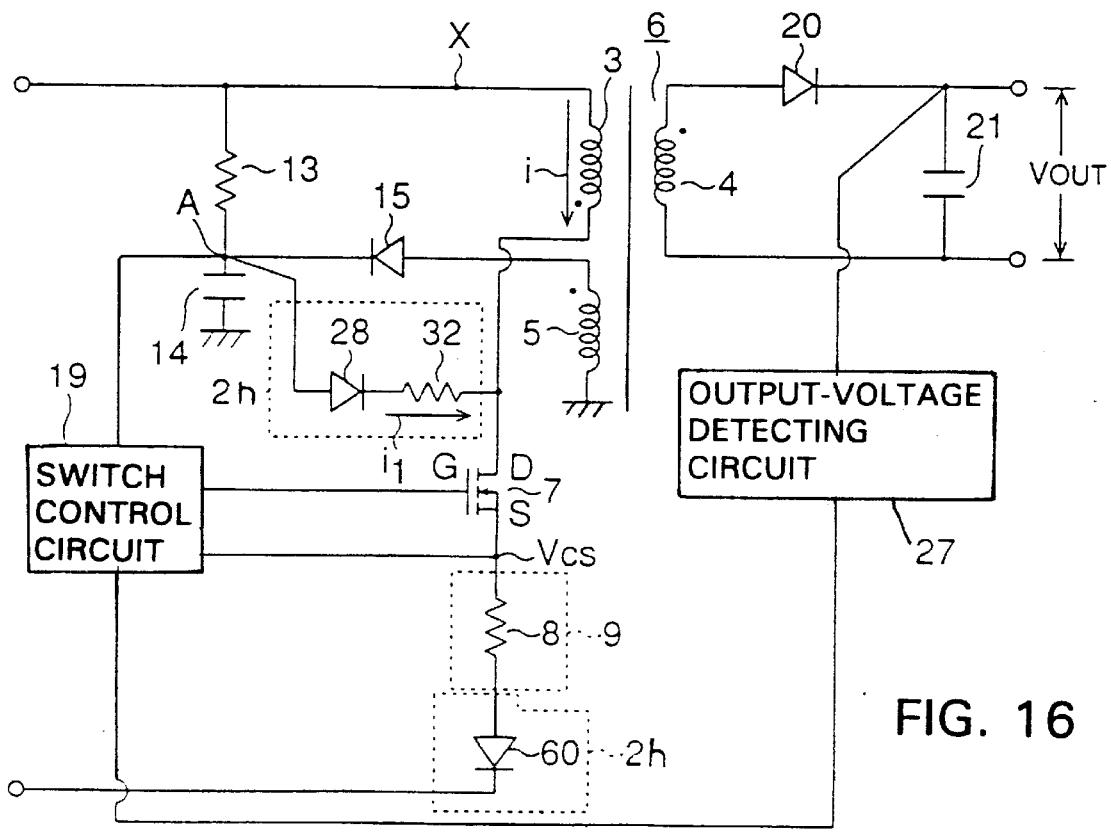
FIG. 16 is a circuit diagram of a superimposition circuit which applies a superimposition current and a superimposition voltage to a current sensing circuit, according to still another embodiment of the present invention.
Figure 17:
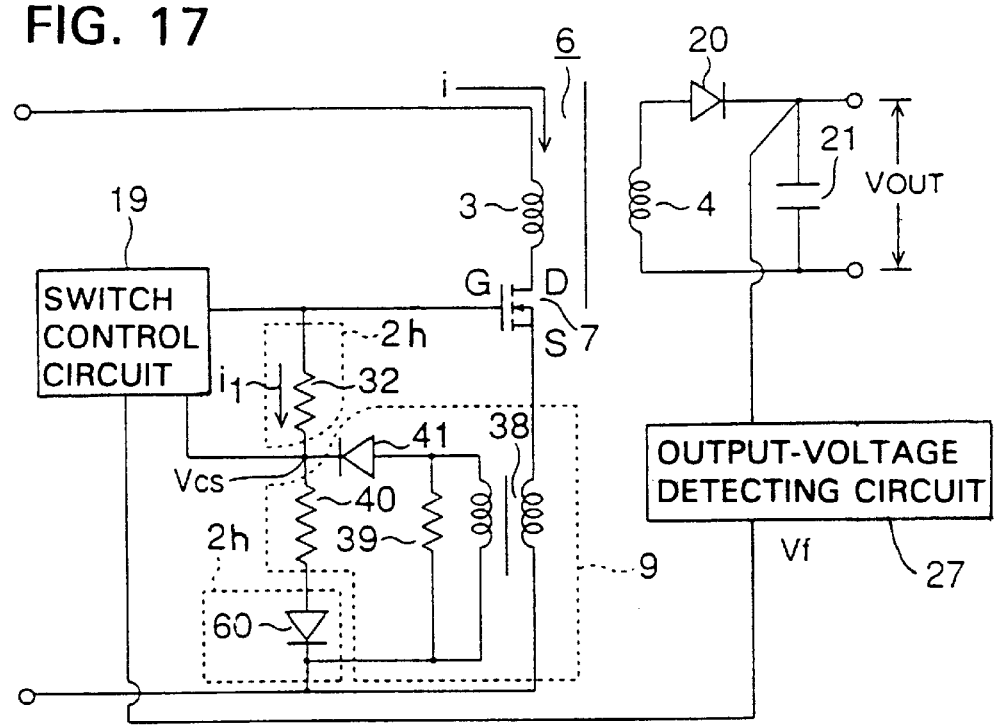
FIG. 17 is a circuit diagram of a superimposition circuit which applies a superimposition current and a superimposition voltage to a current sensing circuit, according to a further embodiment of the present invention.

When a very low current flows through a primary coil 3 as in a case in which a circuit including a transformer 6 having a small winding ratio (a ratio of the number of turns made on the primary coil 3 to that made on the secondary coil 4) has a light load, a low current flows through a superimposition diode 60 in the circuit (in which the superimposition circuit 2f or 2g is made up of the superimposition diode 60 only) as shown in FIG. 10 or 12. When a current flowing through the superimposition diode 60 becomes low, for example, as shown by $I_\alpha$ in FIG. 13 illustrating the relationship between the forward-direction voltage V of a diode and the current I flowing through it, the forward-direction voltage applied to the superimposition diode 60 becomes lower than the superimposition voltage $V_d$ specified in advance. This means that the superimposition voltage $V_d$ specified in advance may not be applied to the current sensing circuit 9.

By contrast, when the resistor 32 is provided in addition to the superimposition diode 60 as in the present embodiment, the superimposition current "$i_1$" flowing through the resistor 32 flows into the current sensing circuit 9 and the superimposition diode 60, and the current flowing through the superimposition diode 60 is biased by the superimposition current "$i_1$." With this biased current, the forward-direction voltage specified in advance is applied to the superimposition diode 60, and the superimposition diode 60 applies the superimposition voltage $V_d$ specified in advance to the current sensing circuit 9.

The present invention is not limited to the above-described embodiments. It can be implemented in various types of embodiments. In the above-described embodiments, a switching power supply of a flyback converter type having the transformer 6 is described. The same advantages as those in the above-described embodiments can be obtained by providing a superimposition circuit, or a superimposition circuit and a superimposition control circuit, for a switching power supply which controls a switching element in the current-mode control method even if the power supply is of a converter type other than the flyback converter type.

What is claimed is:

1. In a switching power supply having a switching element for supplying an output voltage in response to a switching-on-and-off thereof; a current sensing circuit for converting a current flowing through said switching element into a voltage and for detecting and outputting said voltage; an output-voltage detecting circuit for detecting and outputting an output voltage; and a switching control circuit of the current-mode control type for controlling the switching-on period of said switching element so as to stabilize said output voltage according to the detected voltage of said output-voltage detecting circuit and the detected voltage of said current sensing circuit, the improvement comprising a superimposition circuit for applying at least one of a substantially constant superimposition current and a substantially constant superimposition voltage to said current sensing circuit during an entire switching-on period of said switching element.

2. A switching power supply according to claim 1, wherein said superimposition circuit supplies a superimposition voltage and comprises a superimposition diode which generates the superimposition voltage.

3. In a switching power supply having a switching element for supplying an output voltage in response to a switching-on-and-off thereof; a current sensing circuit for converting a current flowing through said switching element into a voltage and for detecting and outputting said voltage; an output-voltage detecting circuit for detecting and outputting an output voltage; and a switching control circuit of the current-mode control type for controlling the switching-on period of said switching element so as to stabilize said output voltage according to the detected voltage of said output-voltage detecting circuit and the detected voltage of said current sensing circuit, the improvement comprising a superimposition circuit for applying at least one of a superimposition current and a superimposition voltage to said current sensing circuit during a switching-on period of said switching element;

said superimposition circuit comprising a superimposition diode which generates the superimposition voltage; and further comprising a superimposition control circuit for detecting said current and controlling said superimposition circuit so as to supply said superimposition voltage only when the detected current is lower than a specified current.

4. In a switching power supply having a switching element for supplying an output voltage in response to a switching-on-and-off thereof; a current sensing circuit for converting a current flowing through said switching element into a voltage and for detecting and outputting said voltage; an output-voltage detecting circuit for detecting and outputting an output voltage; and a switching control circuit of the current-mode control type for controlling the switching-on period of said switching element so as to stabilize said output voltage according to the detected voltage of said output-voltage detecting circuit and the detected voltage of said current sensing circuit, the improvement comprising a superimposition circuit for applying at least one of a superimposition current and a superimposition voltage to said current sensing circuit during a switching-on period of said switching element;

and further comprising a superimposition control circuit for detecting said current and controlling said superimposition circuit so as to apply said superimposition current or superimposition voltage only when the detected current is lower than a specified current.

5. In a switching power supply having a switching element for supplying an output voltage in response to a switching-on-and-off thereof; a current sensing circuit for converting a current flowing through said switching element into a voltage and for detecting and outputting said voltage; an output-voltage detecting circuit for detecting and outputting an output voltage; and a switching control circuit of the current-mode control type for controlling the switching-on period of said switching element so as to stabilize said output voltage according to the detected voltage of said output-voltage detecting circuit and the detected voltage of said current sensing circuit, the improvement comprising a first superimposition circuit for applying a substantially constant superimposition current and a second superimposition circuit for applying a substantially constant superimposition voltage to said current sensing circuit during an entire switching-on period of said switching element.

6. A switching power supply according to claim 5, wherein said second superimposition circuit comprises a superimposition diode which generates the superimposition voltage.

7. In a switching power supply having a switching element for supplying an output voltage in response to a switching-on-and-off thereof; a current sensing circuit for converting a current flowing through said switching element into a voltage and for detecting and outputting said voltage; an output-voltage detecting circuit for detecting and outputting an output voltage; and a switching control circuit of the current-mode control type for controlling the switching-on period of said switching element so as to stabilize said output voltage according to the detected voltage of said output-voltage detecting circuit and the detected voltage of said current sensing circuit, the improvement comprising a first superimposition circuit for applying a superimposition current and a second superimposition circuit for applying a superimposition voltage to said current sensing circuit during a switching-on period of said switching element;

said second superimposition circuit comprising a superimposition diode which generates the superimposition voltage; and further comprising a superimposition control circuit for detecting said current and controlling said second superimposition circuit so as to supply said superimposition voltage only when the detected current is lower than a specified current.

8. In a switching power supply having a switching element for supplying an output voltage in response to a switching-on-and-off thereof; a current sensing circuit for converting a current flowing through said switching element into a voltage and for detecting and outputting said voltage; an output-voltage detecting circuit for detecting and outputting an output voltage; and a switching control circuit of the current-mode control type for controlling the switching-on period of said switching element so as to stabilize said output voltage according to the detected voltage of said output-voltage detecting circuit and the detected voltage of said current sensing circuit, the improvement comprising a first superimposition circuit for applying a superimposition current and a second superimposition circuit for applying a superimposition voltage to said current sensing circuit during a switching-on period of said switching element; and further comprising a superimposition control circuit for detecting said current and controlling said first and second superimposition circuits so as to apply said superimposition current or superimposition voltage only when the detected current is lower than a specified current.

* * * * *